United States Patent [19]
Patient et al.

[11] Patent Number: 5,152,585
[45] Date of Patent: Oct. 6, 1992

[54] ELECTRO-HYDRAULIC BRAKING SYSTEM WITH MASTER CYLINDER PILOTED VALVE

[75] Inventors: Daniel J. Patient, Sterling Heights; David F. Scherer, Ortonville; Kenneth S. Towers, Royal Oak; Richard H. Kolm, Brighton, all of Mich.

[73] Assignee: Allied-Signal Inc., Morris Township, Morris County, N.J.

[21] Appl. No.: 786,142

[22] Filed: Oct. 31, 1991

[51] Int. Cl.⁵ .............................................. B60T 8/32
[52] U.S. Cl. ................................. 303/10; 303/14; 303/69; 303/100; 303/113 R; 303/113 TR; 303/113 SS; 303/113 AP; 303/117; 303/DIG. 3; 303/DIG. 5
[58] Field of Search ........... 303/93, 10, 68, 69, 303/11, 14–18, 100, 92, 113 TR, 113 R, DIG. 5, DIG. 6, DIG. 3, DIG. 4, 117, 113 SS, 113 AP, 115 PP, 116 R, 116 SP, 119 R

[56] References Cited

U.S. PATENT DOCUMENTS

| | | | |
|---|---|---|---|
| 3,661,427 | 5/1972 | Hodge | 303/DIG. 5 |
| 4,416,347 | 11/1983 | Bertling et al. | 303/113 TR |
| 4,768,841 | 9/1988 | Watanabe | 303/113 SS |
| 4,826,255 | 5/1989 | Volz | 303/10 |
| 4,878,715 | 11/1989 | Toda | 303/113 TR |
| 5,037,161 | 8/1991 | Tackett | 303/14 X |
| 5,076,647 | 12/1991 | Grana et al. | 303/68 X |

Primary Examiner—Douglas C. Butler

[57] ABSTRACT

A brake system (20) comprising: a master cylinder (26) and a pump (12) for selectively pressurizing an associated brake cylinder or cylinders; a motor (14) for powering the pump; a control circuit (16,90) for modulating motor speed in response to a signal indicative of desired braking effort and actual braking effort; and a control valve (30) responsive to master cylinder pressure for controlling pump flow and for permitting the decay of pressure in the brake cylinders.

12 Claims, 2 Drawing Sheets

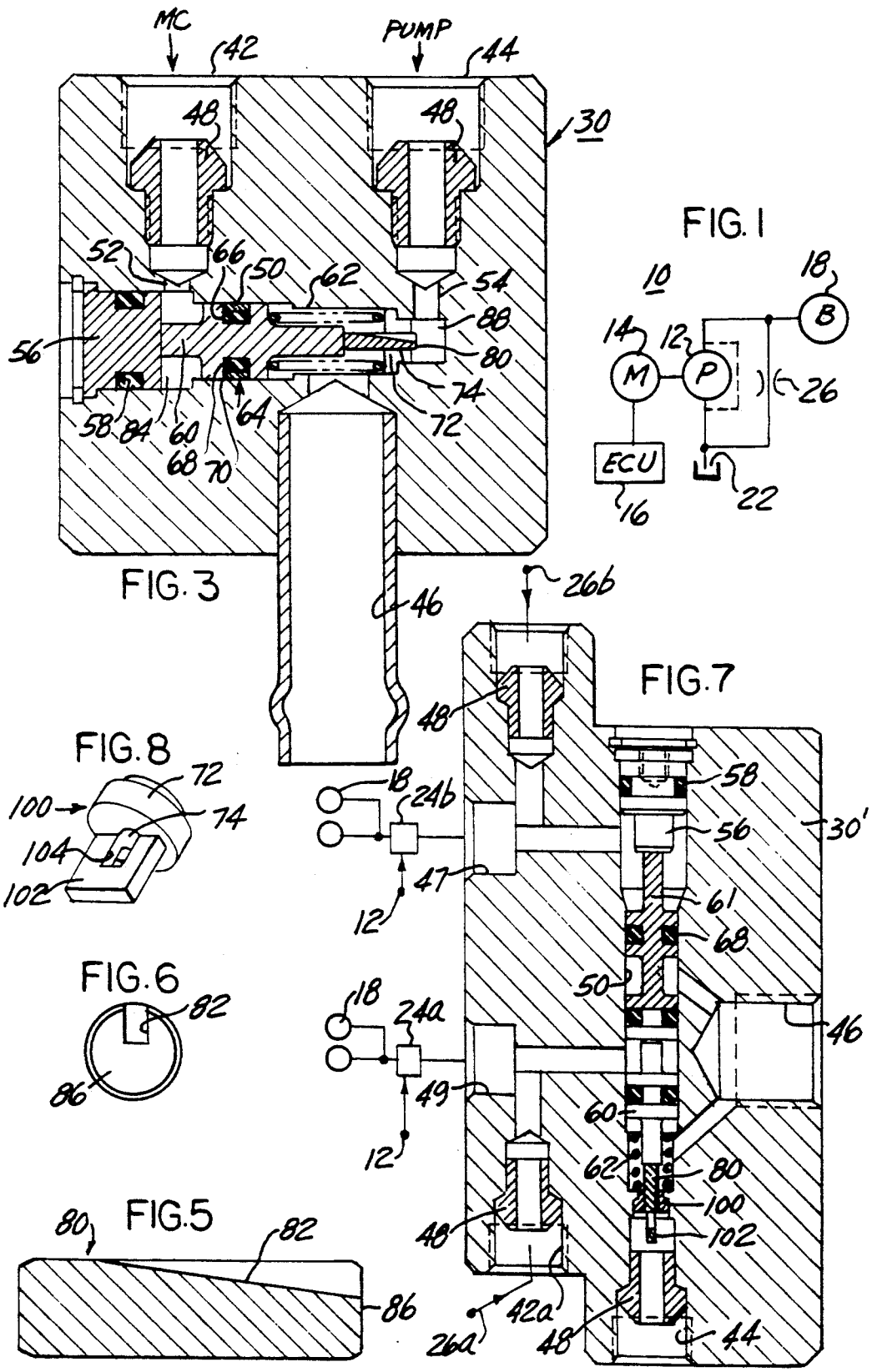

ELECTRO-HYDRAULIC BRAKING SYSTEM WITH MASTER CYLINDER PILOTED VALVE

BACKGROUND AND SUMMARY OF THE INVENTION

The present invention generally relates to an electro-hydraulic braking system in which the braking force acting upon a service brake is generated by an electrically controlled pump.

A simplified version of this system is shown in FIG. 1. This system 10 comprises a pump 12 powered by a motor 14 in response to control signals by an electric control unit (ECU) 16. The pump 12 directly pressurizes a brake cylinder 18. The speed of the motor 14/pump 12 is controlled to modulate brake system pressure in accordance with a commanded brake pressure signal. In order for the brake system pressure to decay or decrease quickly, fluid within the brake system must flow to a drain or reservoir 22. The speed of the pressure decay can of course be increased dramatically if the pump direction is reversed, however, this adds to the complexity of the system. As can be appreciated, when the pump speed is slowed or when the pump is brought to a halt, brake system pressure will decay through the internal leak passages 24 of the pump, however, the time required for such decay is relatively long. One solution is to add an orifice 26 (an additional leak path) across the pump 12 to speed the brake pressure decay. This approach requires that the pump capacity or displacement be increased since the pump now must be sized to supply the leakage flow as well as to supply fluid to adequately pressurize the brake cylinder 18. If a fixed orifice 26 is used, it must be large enough to provide a quick decay of the brakes when the motor is turned off. A large orifice will however require very large flows to generate high pressures and would require an unreasonably high power output motor/pump system.

It is an object of the present invention to provide an improved electro-hydraulic braking system.

Accordingly, the invention comprises: a brake system comprising: a master cylinder and a pump for selectively pressurizing an associated wheel cylinder or cylinders. An isolation valve may be provided to provide the selective communication. The system including a motor for powering the pump and first means for modulating motor speed in response to a signal indicative of desired braking effort and actual braking effort. A control valve is provided in circuit with the pump and wheel cylinder. The valve is responsive to master cylinder pressure to control the flow area in the path to a reservoir. By reducing the flow area at high master cylinder pressure a smaller pump can be used. Additionally, when the master cylinder pressure is decreased, the control valve increases the flow area to the reservoir allowing for a rapid pressure decay of the brakes.

Many other objects and purposes of the invention will be clear from the following detailed description of the drawings.

BRIEF DESCRIPTION OF THE DRAWINGS

In the drawings:

FIG. 1 illustrates a block diagram showing a simplified electro-hydraulic brake system.

FIG. 3 illustrates a detailed view of a pilot operated variable orifice valve shown in FIG. 2.

FIGS. 5 and 6 illustrate various views of a floating piston used in the control valve.

FIGS. 7 and 8 show an alternate embodiment of a variable orifice valve.

DETAILED DESCRIPTION OF THE DRAWINGS

Figure 2:
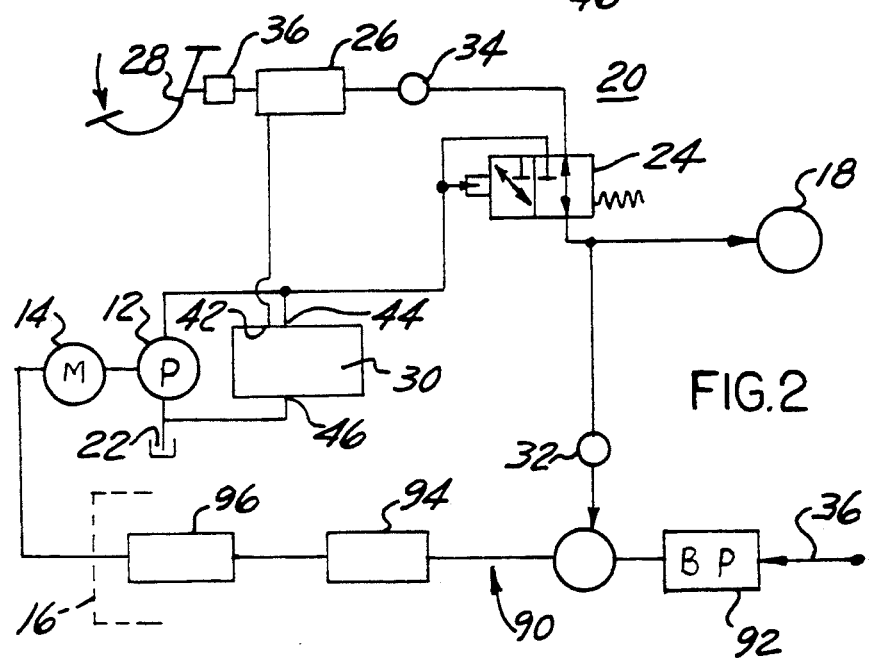
FIG. 2 illustrates a schematic diagram of a system incorporating the teachings of the present invention.

Reference is made to FIGS. 2 and 3. FIG. 2 schematically illustrates a system 20 for directly pressurizing a brake and more specifically a hydraulic wheel or brake cylinder 18. While one such cylinder 18 is shown, it should be appreciated that a brake system will include a plurality of wheel cylinders. FIG. 3 shows a more detailed view of a pilot operated variable orifice 30 that is also referred to as control valve 30. The system comprises a pump 12 powered by an electric motor 14 which in turn receives a control signal from an ECU 16. The control valve 30 is connected in parallel across the outlet of the pump and a reservoir 22. The pump is also connected to a three-way isolation valve 24 of known variety. The output of the master cylinder is also be communicated to the isolation valve. In the preferred embodiment of the invention the master cylinder 26 is of the manual or unboosted type. This type of master cylinder would typically generate a maximum pressure in any of its one or more chambers in the range of 600–700 psi (41.4–48.3 bar) which is less than the output pressures developed by, for example, a vacuum boosted master cylinder. Manual master cylinders, are not used in current brake systems, as a primary source of brake pressure, because they require the operator to apply excessive forces on a pedal such as pedal 28. As will be seen below the master cylinder is not used as a primary means of activating a brake cylinder during normal service brake application but is used in a fail-safe mode of operation. As such, and as used in the current invention, it is not necessary for the master cylinder to generate high output pressures. As will also be seen below the pump and its related control system are used to supply elevated or boosted pressure to the brake cylinders during normal service braking periods. The master cylinder could, of course, be of the powered or boosted type generating higher pressure levels, however this would unnecessary add to the cost of the system. In FIG. 2 the brake pedal 28 is shown as activating the master cylinder 26 in a known manner. A first pressure sensor such as 32 is provided to generate a signal indicative of the pressure in the wheel cylinder 18. The system 20 also includes means for generating a brake effort signal. Such signal can be provided from an additional pressure sensor 34 which generates a signal indicative of the output pressure generated by the master cylinder or alternatively, a force pedal sensor such as 36 can be provided to generate a signal indicative of the applied pedal force. The operation of the system will be described below.

Figure 4:
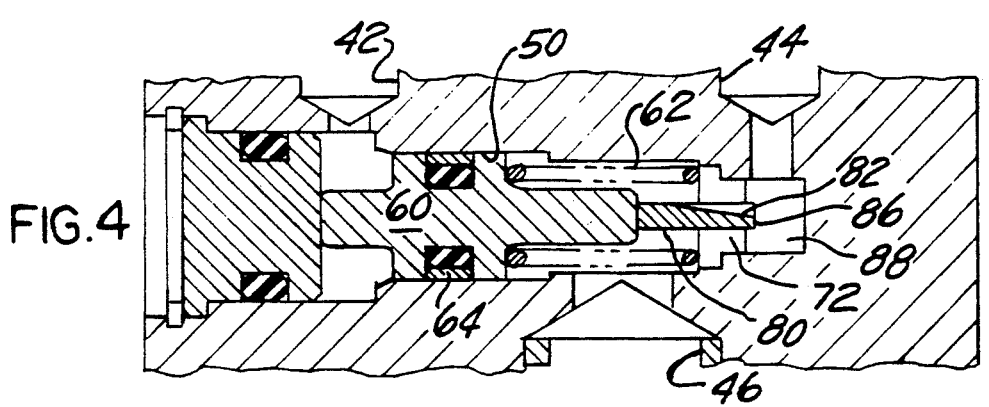
FIG. 4 illustrates an exploded portion of the control valve.

Reference is now made to FIGS. 3 through 6 which illustrate various views of the control valve 30. The valve 30 provides a variable orifice from the pump 12 to the reservoir 22 as a function of the master cylinder (MC) pressure. At high MC pressure, the effective orifice is small, thereby reducing the flow requirement of the pump to maintain the high pressure. At low MC pressures, the valve presents a large flow area enabling a quick decay of the brakes when the motor is turned off. As shown in FIG. 3, the valve 30 comprises a valve housing 40 having three ports. Ports 42 and 44 are respectively connected to the master cylinder 26 and pump 12. The third port 46 is communicated to the reservoir 22. The ports 42 and 46 may also include an SAE inverted flare fitting 48 of known variety to interconnect the master cylinder and pump. The valve 30 includes a cross-bore 50 which is communicated to the ports 42 and 44 through flow passages 52 and 54. As shown in FIGS. 3 and 4, the bore 50 is enclosed by a plug 56 and seal such as O-ring 58. Situated within the bore 50 is a piston 60 biased to the left, as shown in the drawings by a spring 62. The piston 60 includes a seal generally shown as 64 which is fitted within an annular recess 66. As shown in the drawings, the seal 64 comprises an O-ring surrounded by a low friction sealing ring 70 such as a Glyd ring manufactured by Shamban Inc. Situated in the right hand portion of bore 50, in communication with passage 54, is an orifice plate 72 defining an orifice 74. Positioned in the orifice 74 is a free floating, sliding pin 80. The pin 80 is generally cylindrically shaped and includes a tapered slot 82 as more clearly shown in FIGS. 5 and 6.

Reference is again made to the brake system 20 shown in FIG. 2. If, for example, brake effort is measured by the pedal force transducer 36, such signal is modified or scaled in block 92 to generate a signal indicative of brake pressure. Block 92, or an equivalent element could also include a gain function so that in the steady state the pressure produced by the pump will be some multiple of the pressure generated in the master cylinder 26. In this manner the control portion of the system will control the pump to produce a boosted pressure. The overall gain of the system would be chosen to approximate the gain of a conventional power assist brake system. As an aside, if the brakes to be controlled are the rear brakes of the vehicle, then block 92 will also perform a front-to-rear scaling or proportioning to account for the weight distribution of the vehicle. The output of block 92 is a commanded wheel cylinder pressure which is compared to the signal derived from the other pressure sensor 32. The ECU 16 compares the actual brake pressure to the desired pressure to generate an error signal which is operated upon by a gain function 94. The gain function 94 may be implemented as a proportional-integral-differential (PID) controller. The output of the gain function 94 or PID controller is communicated to a motor control block 96 to generate a motor command signal such as commanded motor current to cause the motor to rotate the pump at a speed which will drive the error signal to zero. The block 96 may include circuitry to control and limit motor current as is known in the art. One or more pumps 12 and motors 14 can be used, with an associated control system, to control designated sets of wheel or brake cylinders. In addition, and as mentioned above, the master cylinder 26 is used to provide a fail-safe mode of operation in the event of a failure of the pump, or electronics. The control system could also include a sensing function to determine if such a failure has occurred. Such a sensing function might include the ability to detect an open circuit or short circuit in an electrical component or in the motor as known in the art. Alternately, the sensing function may include the ability to sense that the pump as will as the system is not able to generate a pressure in a brake cylinder of sufficient magnitude to drive the error signal toward zero. Upon sensing such a failure, such as by sensing a sustained level of error signal for a predetermined time, the control system would activate a buzzer or activate a warning light thereby informing the operator that the brake system is operating in the fail-safe mode and that servicing is required.

As can be seen in FIG. 2, the output of the pump is also connected to the isolation valve 24. The isolation valve can be a pressure or force differential isolation valve as is known in the art, or alternatively can be an electrically operated isolation valve. If, for example, the isolation valve 24 is a differential pressure valve, then as the pressure generated by the pump increases toward the level of master cylinder pressure, the isolation valve changes state, i.e., closes, thereby isolating the master cylinder from the wheel cylinder 18. Thereafter the pressure within wheel cylinder 18 is controlled solely by modulating the speed of the pump 12 in response to the brake effort signal. If the isolation valve 24 is an electrically responsive solenoid valve, then upon application of the brake pedal the ECU 16 will cause the isolation valve to change state thereby isolating the master cylinder from the remainder of the system and communicating the pump 12 to the wheel cylinder or cylinders 18.

As mentioned above, one purpose of the valve 30 is to enable the pump 12 to rapidly fill the wheel cylinder 18. This is accomplished by controlling the flow rate through the valve 30. As the operator of the vehicle depresses the brake pedal 28 master cylinder pressure will increase. Fluid from the master cylinder is communicated to the valve 30 through the port 42. The increased pressure which bears upon the left end face of the piston 60 urging the piston to the right against the force of the spring 62. If the brakes had not previously been applied, the pump speed is zero and its output pressure zero. The rightward motion of the piston 60 urges the free floating pin 80 into the orifice 74 which restricts the leakage or bypass flow of fluid from the pump 12 which has now been activated by the control system 90. Typically, the outlet flow from the pump, received at port 44 flows through valve 30 and to the port 46 through passage 54, orifice 74, slot 82, and the right hand portion of bore 50. As the pin 80 is moved into the orifice 74 the flow passage defined between the orifice 74 and the slot 82 decreases in size thereby reducing pump bypass flow between ports 44 and 46, i.e., into the reservoir 22, and permitting a greater amount of pump flow to go the wheel cylinder 18 (as can be seen in FIG. 2) to rapidly pressurize same. Typically, the working areas of the piston 60 and the stiffness of the spring 62 are sized to permit the piston to move to the right in response to master cylinder pressure to effectively, but not necessarily completely close, orifice 74 upon the initial application of the brake pedal. As the pressure developed by the pump 12 increases toward its commanded value, the pressure in chamber 88 increases and bears against surface 86 of the piston 60. As the area of surface 86 is much less than the opposing area of the piston 60 exposed to master cylinder pressure, there will not be sufficient force developed to move the piston 60 and pin 80 to the left. When the brake pedal 28 is released the fluid pressure in chamber 84 acting on the piston reduces dramatically. Whereupon the spring 62 urges the piston to the left. At this time the fluid pressure, generated by the pump 12, acting on the right hand working surface 86 of the pin 80 also urges the pin to the left thereby effectively enlarging the flow area through orifice 74, increasing the flow between port 44 and port 46. As mentioned, this increased flow area permits the rapid depressurization of the wheel or brake cylinders 18.

Figure 9:
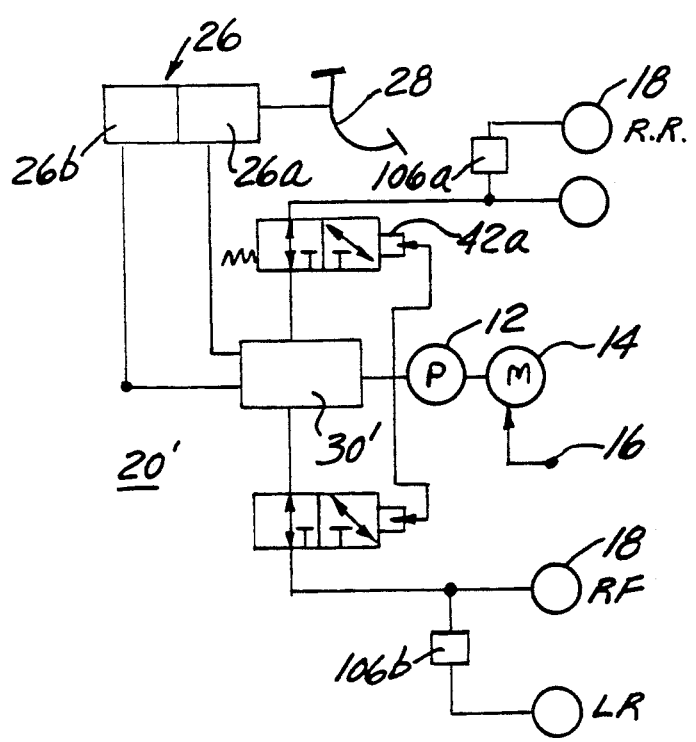
FIG. 9 shows another brake system.

Reference is made to FIGS. 7 through 9 which illustrate an alternate valve 30' and an exemplary braking system 20'. As can be appreciated, the valve 30' is functionally similar to valve 30 illustrated in the above figures. Valve 30' has been adapted to communicate to a master cylinder such as 26 (see FIG. 9) having primary and secondary chambers 26a and 26b respectively. As can be appreciated from the discussion below, the valve 30' will operate when both chambers 26a and 26b of the master cylinder 26 are operating properly, or alternatively, when there is a failure in one or the other of the chambers or in the hydraulic lines leading from the master cylinder 26 to the valve 30'. Additionally, the valve 30' includes additional ports 47 and 49, which are communicated to separate isolation valves shown as 24a and 24b. These isolation valves are communicated to one or more brake cylinders generally shown as a 18. If one of the brake cylinders 18 corresponds to a brake cylinder of a rear axle brake, then a proportioning valve, of known variety, can be inserted.

As can be seen from FIG. 7, the top portion of the piston 60 receives master cylinder pressure from its primary chamber 26a. Situated above piston 60, in passage 50, is a second piston 61. The top portion of piston 61 is exposed to master cylinder pressure received from the secondary chamber 26b. The valve 30' also includes a control orifice 100 which is also shown in FIG. 8. The control orifice also includes an orifice plate 72 and a central passage 74 defining an orifice. Situated below and formed as an integral part of the orifice plate 72 is pin retainer 102 having a center portion 104 removed. This center portion 104 can be thought of as an extension of the orifice 74. The purpose of the pin retainer 102 is to prevent the pin from becoming jammed in the orifice. The pin retainer will limit the downward motion of pin 80. Reference is briefly made to FIG. 9 which diagramatically illustrates a hydraulic brake system. As mentioned above, the primary and secondary master cylinder chambers 26a and 26b are communicated to the valve 30'. The various master cylinder chambers are also communicated to the isolation valves 24a and 24b which as before, may be of the pressure differential type. The pump 12 communicates to the valve 30' and isolation valves 24a, 24b, and is driven by motor 14. The output of isolation valve 24a is communicated to two brake cylinders. As illustrated, valve 24a is communicated to the left front brake cylinder and also to a right rear brake cylinder through a first proportioning valve 106a. Isolation valve 24b is communicated to the right front brake cylinder and also to the left rear brake cylinder through another proportioning valve 106b.

The operation of the valve 30' and system 20' is as follows. As is known in the art the pressure generated in the primary chamber is typically slightly larger than the pressure generated in the secondary chamber. With the master cylinder operating properly, when the operator applies a force to the brake pedal 28, primary master cylinder pressure is communicated to port 42a and second master cylinder pressure is communicated to port 42b of valve 30'. Primary master cylinder pressure received at the top portion of piston 60 urges piston 60 downwardly and will similarly urge piston 61 upwardly against the plug 56 because of the slight differences in the primary and secondary master cylinder pressures. The downward motion of piston 60 causes pin 80 to move within the orifice 72 thereby restricting flow between ports 44 and 46, that is, between the pump and the reservoir 22. In essence, the operation of valve 30' during the normal functioning of the master cylinder is identical to that of valve 30. If there is a failure in the master cylinder 26 such that secondary master cylinder pressure cannot be generated, the operation of valve 30' is identical to the operation of the valve with the fully functioning master cylinder. As described above, there normally will exist a difference in the level of the primary and secondary master cylinder pressures, with the primary master cylinder pressure being the greater of the two. The fact that secondary master cylinder pressure cannot be communicated to port 42b, is merely the extreme operating condition. In this condition, with the primary chamber fully functioning, hydraulic fluid is still communicated to piston 60. This fluid urges piston 60 downward against the pressure of the pump and also causes piston 61 to move upwardly in the manner described above. Further, if there is a failure in the master cylinder 26 so that primary master cylinder pressure cannot be communicated to port 42a of valve 30', secondary master cylinder pressure is communicated to the top portion of piston 61. This pressure causes piston 61 to move downwardly and move piston 60 against the force of spring 62 and also turn moves the pin 80. When the operator reduces the force applied to the brake pedal, the master cylinder pressures operating on pistons 60 and/or 61 will similarly diminish. In this situation the pin will move upwardly in the orifice plate in response to the pressure of the pump and forces generated by the return spring thereby more fully opening a flow area of orifice 74 to permit fluid within the various brake cylinders to flow therefrom resulting in corresponding decrease in brake cylinder pressure in the same way that will happen in the valve 30.

Many changes and modifications in the above described embodiment of the invention can, of course, be carried out without departing from the scope thereof. Accordingly, that scope is intended to be limited only by the scope of the appended claims.

We claim:
1. A brake system (20) comprising:
 a master cylinder (26) and a pump (12) for selectively pressurizing an associated brake cylinder or cylinders (18);
 a motor (14) for powering the pump;
 first means (16,90) for modulating motor speed in response to a signal indicative of desired braking effort and actual braking effort;
 valve means (30) responsive to master cylinder pressure for controlling the effective flow area presented between the pump and a reservoir allowing for attenuated flow therebetween at high master cylinder pressures to enable the pump to rapidly pressurize the brake cylinder and larger flows at lower master cylinder pressures to enable a rapid pressure decay in the brake cylinders.

2. The system (20) as defined in claim 1 wherein the valve means (30) comprises:
 a first master cylinder port (42, 42a) communicated to the master cylinder (26), a second port (44) communicated to the pump (12) and a third port (46) communicated to the reservoir (22),
 a bore (50) interconnecting various ports;

a control orifice (72,74) interconnecting the bore (50) with the second port (44), a first piston (60) positioned in the bore (50) and movable toward the control orifice in response to master cylinder pressure, received at the first master cylinder port (42a), a pin (80) slidably positioned in the control orifice (72,74) in response to differential pressures or forces applied thereto, including flow control means (82) cooperating with the control orifice to vary the flow area as a function of the position of the pin (80) in the control orifice (72,74), one end of the pin (80) remote from the position (60), exposed to pump pressure, to urge the pin (80) out of the control orifice (74).

3. The system as defined in claim 2 including a spring (62) for urging the pin (80) out of the control orifice (74).

4. The system (20) as defined in claim 2 wherein the pin (80) is cylindrically shaped and wherein the flow control means (82) comprises a tapered slot or groove (82) formed on the pin (80) and extending through to the end (86) of the pin (80) received in the control orifice.

5. The system as defined in claim 4 wherein the pin (80) is separate from the piston (60).

6. The system as defined in claim 4 wherein the cross-sectional area of the end (86) of the pin (80) is smaller than the area of the piston (60) exposed to master cylinder pressure.

7. The system as defined in claim 6 wherein the first piston (60) includes a seal (64) having a low coefficient of friction to prevent leakage between the bore (50) and piston (60).

8. The system as defined in claim 7 including isolation valve means (24) for selectively communicating one of master cylinder (26) pressure and the pump (12) to the wheel cylinder (18).

9. The system as defined in claim 4 wherein the master cylinder (26) includes a primary chamber (26a) and a secondary chamber (26b) and wherein the valve means (30') includes first means responsive to the pressure generated by either primary and secondary chambers (26a, 26b) for controlling the flow area of the control orifice (74).

10. The system as defined in claim 9 wherein the first master cylinder port (42a) is communicated to the primary chamber (26a), the valve means (30') including a second master cylinder port (46b), a second piston (61) arranged to move the first piston (60) in response to pressure received at the second master cylinder port (42b) when such pressure exceeds the pressure received at the first master cylinder port (42a).

11. The system as defined in claim 1 wherein the master cylinder is an unboosted master cylinder and wherein the first means includes means to control the pressure generated by the pump to a multiple of the pressure generated by the master cylinder.

12. The system as defined in claim 11 wherein the maximum pressure generated in any chamber of the master cylinder is less than 700 psi.

* * * * *